(12) United States Patent
Ishigo et al.

(10) Patent No.: US 9,004,767 B2
(45) Date of Patent: Apr. 14, 2015

(54) HALF BEARING AND PLAIN BEARING (71) Applicant: Daido Metal Company Ltd., Nagoya (JP)

(72) Inventors: Osamu Ishigo, Inuyama (JP); Motohiko Koushima, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 36 days.

(21) Appl. No.: 13/786,946

(22) Filed: Mar. 6, 2013

(65) Prior Publication Data
US 2013/0251293 A1 Sep. 26, 2013

(30) Foreign Application Priority Data

Mar. 19, 2012 (JP) .................................. 2012-061583

(51) Int. Cl.
| F16C 33/10 | (2006.01) |
| F16C 9/02 | (2006.01) |
| F16C 9/04 | (2006.01) |
| F16C 17/02 | (2006.01) |
| F16C 33/04 | (2006.01) |

(52) U.S. Cl.
CPC ... *F16C 9/02* (2013.01); *F16C 9/04* (2013.01); *F16C 17/022* (2013.01); *F16C 33/046* (2013.01); *F16C 33/103* (2013.01); *F16C 33/1065* (2013.01); *F16C 2360/22* (2013.01); *F16C 2240/42* (2013.01)

(58) Field of Classification Search
USPC .......... 384/275, 276, 286, 288, 291, 294, 397
See application file for complete search history.

(56) References Cited

U.S. PATENT DOCUMENTS

| 5,009,522 | A | * | 4/1991 | Hahn | .............................. 384/288 |
| 7,234,870 | B2 | * | 6/2007 | Kitahara et al. | .............. 384/288 |
| 7,572,060 | B2 | * | 8/2009 | Kuroda et al. | ................. 384/276 |
| 2005/0201647 | A1 | | 9/2005 | Kuroda et al. | |
| 2011/0058761 | A1 | | 3/2011 | Ishigo et al. | |

FOREIGN PATENT DOCUMENTS

| JP | 04-219521 | 8/1992 |
| JP | 07-139539 | 5/1995 |
| WO | WO 2007/016915 | 2/2007 |

OTHER PUBLICATIONS

Search Report dated Aug. 29, 2013 from corresponding patent application in Great Britain, Serial No. GB1304960.6 (one page).

* cited by examiner

*Primary Examiner* — James Pilkington
(74) *Attorney, Agent, or Firm* — Harness, Dickey & Pierce, P.L.C.

(57) ABSTRACT

A half bearing for supporting a crank shaft of an internal combustion engine is provided. The half bearing having a main semi-cylindrical part, two crush reliefs, and two transition regions. Each crush relief has a depth from a imaginary plane at a circumferential end surface of the half bearing greater than a depth from the imaginary plane at a connecting position between each crush relief and the transition region. A plurality of circumferential grooves extend in a circumferential direction in the main semi-cylindrical part along their entire length in the circumferential direction, and the plurality of circumferential grooves extend also in the transition region continuously.

8 Claims, 9 Drawing Sheets

| | DEPTH D1 OF CRUSH RELIEF (mm) | LENGTH L1 OF TRANSITION REGION (mm) | SHAPE OF TRANSITION REGION SURFACE | PRESENCE/ ABSENCE OF CRUSH RELIEF GROOVE | PHASE OF CIRCUMFERENTIAL GROOVE AND CRUSH RELIEF GROOVE | BEARING TEMPERATURE (°C) |
|---|---|---|---|---|---|---|
| EMBODIED PRODUCT NO.1 | 0.015 | 2 | INWARDLY CONVEX CURVED SURFACE | ABSENT | — | 140 |
| EMBODIED PRODUCT NO.2 | 0.015 | 2.5 | OUTWARDLY CONVEX CURVED SURFACE + INWARDLY CONVEX CURVED SURFACE | ABSENT | — | 129 |
| EMBODIED PRODUCT NO.3 | 0.025 | 3.5 | OUTWARDLY CONVEX CURVED SURFACE | ABSENT | — | 149 |
| EMBODIED PRODUCT NO.4 | 0.015 | 2 | INWARDLY CONVEX CURVED SURFACE | PRESENT | ALIGNED | 124 |
| EMBODIED PRODUCT NO.5 | 0.015 | 2 | INWARDLY CONVEX CURVED SURFACE | PRESENT | MISALIGNED | 116 |
| EXISTING PRODUCT | — | — | — | ABSENT | — | 159 |

FIG.21

| TEST INSTRUMENT | BEARING TEST INSTRUMENT |
|---|---|
| SHAFT DIAMETER | 45mm |
| SHAFT ROTATING SPEED | 6000rpm |
| CONTACT PRESSURE | 30MPa |
| OIL FEED SYSTEM | FORCED OIL FEED |
| OIL FEED PRESSURE | 0.4MPa |
| TEMPERATURE OF FED OIL | 60°C |
| LUBRICATING OIL | 5W-20 |

FIG.22

HALF BEARING AND PLAIN BEARING

BACKGROUND

(1) Field of the Invention

The present invention relates to a half bearing for supporting a crank shaft of an internal combustion engine and to a plain bearing having two half bearings.

(2) Description of Related Art

From the past, a plain bearing constituted by a pair of half bearings has been employed as a main bearing and a connecting rod bearing. A so-called crush relief is formed in a plain bearing adjacent to mating surfaces of half bearings.

A crush relief is a wall-thickness thinner region that is formed in a region adjacent to a circumferential end surface of a half bearing such that a thickness of a wall is thinner toward the circumferential end surface. A crush relief is formed with an intention of absorbing misalignment or deformation of joint surfaces of a pair of half bearings in a state where the half bearings are assembled (see, for example, JP-A-4-219521 and JP-A-7-139539).

Further, in some cases, a plurality of circumferential grooves extending in a circumferential direction are formed in an inner circumferential surface of a half bearing that constitutes a plain bearing. Generally, such circumferential grooves are formed to enhance retainability of lubricating oil in the inner circumferential surface of the half bearing.

However, in recent years, an oil pump has been reduced in size in an internal combustion engine, and thus an amount of lubricating oil supplied to the inner circumferential surface of a bearing has been decreasing. Accordingly, when assembling a pair of half bearings into a cylindrical shape, if the circumferential end surfaces thereof are misaligned, the inner circumferential surfaces of the bearings come into direct contact with a surface of a shaft, and damage to the inner circumferential surfaces of the bearings is likely to occur due to the heat.

Therefore, it is an object of the present invention to provide a half bearing that is less likely to be damaged even if circumferential end surfaces are misaligned when assembling a pair of half bearings into a cylindrical shape and to provide a plain bearing formed by assembling such half bearings into a cylindrical shape.

SUMMARY OF THE INVENTION

In order to accomplish the above-mentioned object, a half bearing of the present invention is a half bearing for supporting a crank shaft of an international combustion engine. The half bearing comprising: a main semi-cylindrical part including a center portion of the half bearing in a circumferential direction; two crush reliefs, each crush relief having a thickness arranged at each circumferential end of the half bearing, the thickness of the crush relief being thinner than that of the main semi-cylindrical part; and two transition regions, each transition region having a thickness arranged between the main semi-cylindrical part and the crush relief, the thickness of the transition region being thinner towards the crush relief. When an imaginary inner circumferential plane is assumed to extend over the crush relief, the imaginary plane is coplanar with the inner circumferential surface of the main semi-cylindrical part, each crush relief has a depth from the imaginary plane at a circumferential end surface of the half bearing greater than a depth from the imaginary plane at a connecting position between each crush relief and the transition region. A plurality of circumferential grooves extend in a circumferential direction in the main semi-cylindrical part along their entire length in the circumferential direction, and the plurality of circumferential grooves extend in the transition region continuously.

Here, a crank shaft is interpreted as a member that includes a journal part, a crank pin part, and a crank arm part. Further, a plain bearing is interpreted as a bearing including a connecting rod bearing and a main bearing. Furthermore, a half bearing is interpreted as a member that has such a shape that a cylinder is divided into half, which, however, should not be interpreted as being divided strictly into half.

A half bearing of the present invention includes a main semi-cylindrical part, a crush relief, and a transition region. The crush relief is formed such that a depth thereof at a position of a circumferential end surface of the half bearing is greater than a depth thereof at a position connecting to the transition region. A plurality of circumferential grooves that extend in the circumferential direction are formed in the main semi-cylindrical part, and the plurality of circumferential grooves are formed to extend into the transition region as well.

Through such a configuration, in a state where the end surfaces of the half bearings are misaligned, an oil flow that flows in the circumferential direction to follow along a surface of a shaft and an oil flow that flows toward the main semi-cylindrical part as being guided by the transition region intersect to collide with each other, whereby a turbulent flow is generated. Accordingly, heat generated as a circumferential end of the main semi-cylindrical part of the bearing comes into contact with a mating shaft is conducted efficiently to the turbulent oil flow, and thus the bearing is prevented from reaching such a high temperature that causes damage thereto.

Other purposes, features, and advantages of the present invention will become clear from the following description of the examples in relation to the accompanying drawings.

DETAILED DESCRIPTION OF THE INVENTION

Hereinafter, Embodiments of the present invention will be described with reference to the drawings. Note that a crush relief is depicted in exaggeration in the drawings in order to facilitate understanding.

Embodiment 1

(Overall Configuration of Bearing Device)

Figure 1:
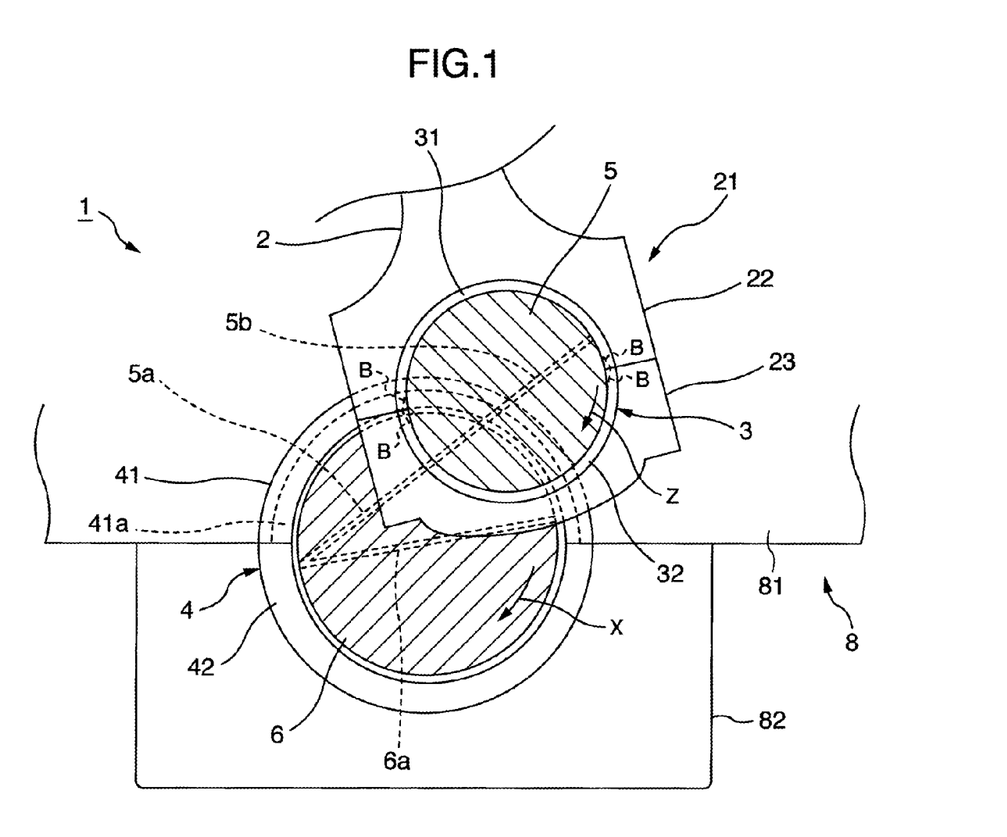
FIG. 1 is a sectional view of a crank shaft of an internal combustion engine, cut at a journal part and a crank pin part.

As shown in FIG. 1, a bearing device 1 of the present Embodiment includes a journal part 6 that is supported by a lower part of a cylinder block 8, a crank pin part 5 that is formed integrally with the journal part 6 to rotate about the journal part 6, and a connecting rod 2 that conveys a reciprocating motion from an internal combustion engine to the crank pin part 5. The bearing device 1 further includes a main bearing 4 that rotatably supports the journal part 6 and a connecting rod bearing 3 that rotatably supports the crank pin part 5, as a plain bearing that supports a crank shaft.

Note that although the crank shaft has a plurality of journal parts 6 and a plurality of crank pin parts 5, here, for convenience of the description, a single journal part 6 and a single crank pin part 5 are shown for description. In FIG. 1, a positional relationship in a depthwise direction of the paper plane is such that the journal part 6 is in the back side of the paper plane and the crank pin part 5 is in the front side.

The journal part 6 is axially supported by a cylinder block lower part 81 of the internal combustion engine through the main bearing 4 that is constituted by a pair of half bearings 41 and 42. A lubricating oil groove 41a is formed in the half bearing 41 located at an upper side in FIG. 1 along an entire length in an inner circumferential surface. Further, the journal part 6 has a lubricating oil channel 6a that penetrates in a diametrical direction, and when the journal part 6 rotates in a direction shown by an arrow X, openings at both ends of the lubricating oil channel 6a alternately communicate with the lubricating oil groove 41a.

The crank pin part 5 is axially supported by a large-end housing 21 of the connecting rod 2 (a rod-side large-end housing 22 and a cap-side large-end housing 23) through the connecting rod bearing 3 that is constituted by a pair of half bearings 31 and 32.

As stated above, lubricating oil discharged by an oil pump to the main bearing 4 is fed into the lubricating oil groove 41a that is formed along the inner circumferential surface of the main bearing 4 through a through-hole formed in a wall of the main bearing 4 from an oil gallery that is formed in a cylinder block wall.

Further, a first lubricating oil channel 6a is formed to penetrate the journal part 6 in the diametrical direction, and the openings at both ends of the first lubricating oil channel 6a are in communication with the lubricating oil groove 41a. Then, a second lubricating oil channel 5a that passes through a crank arm part (not shown) is formed to branch off from the first lubricating oil channel 6a in the journal part 6, and the second lubricating oil channel 5a is in communication with a third lubricating oil channel 5b that is formed to penetrate the crank pin part 5 in the diametrical direction.

In this way, the lubricating oil passes through the first lubricating oil channel 6a, the second lubricating oil channel 5a, and the third lubricating oil channel 5b to be supplied into a space that is formed between the crank pin part 5 and the connecting rod bearing 3 through an end outlet of the third lubricating oil channel 5b (that is, an outlet that opens in an outer circumferential surface of the crank pin part 5).

Hereinafter, although a description will be given with the connecting rod bearing 3 taken as an example of the plain bearing of the present invention, even with the main bearing 4, substantially the same configurations and operational effects are obtained.

(Configuration of Half Bearing)

Figure 2:
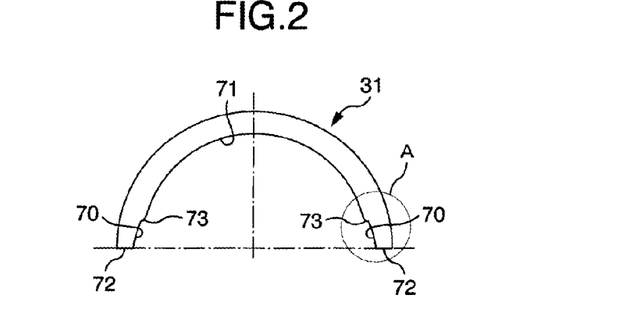
FIG. 2 is a front view of a half bearing of Embodiment 1.
Figure 7:
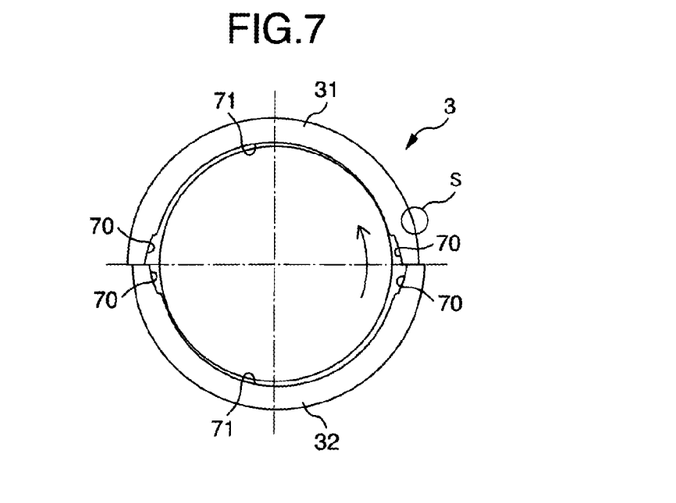
FIG. 7 is a front view showing a state where circumferential end surfaces of the half bearings of Embodiment 1 are misaligned.

The connecting rod bearing 3 of the present Embodiment is formed in a generally cylindrical shape by assembling a pair of half bearings 31 and 32 such that the circumferential end surfaces thereof are joined with each other (see FIG. 7). Each of the half bearings 31 (32) is formed in a semicylindrical shape with a bimetal in which a thin bearing alloy is adhered onto a steel plate, as shown in FIG. 2, and includes a main semi-cylindrical part 71 that is formed to include a center portion in the circumferential direction, crush reliefs 70, 70 that are formed at both circumferential ends, and transition regions 73, 73 that are formed between the main semi-cylindrical part 71 and the crush reliefs 70, 70 such that a thickness of a wall thereof is thinner toward the crush reliefs 70, 70.

The main semi-cylindrical part 71 has a semicylindrical surface that occupies a large portion of the inner circumferential surface of the half bearing 31, and this semicylindrical surface constitutes a primary sliding surface with a mating shaft. Further, a plurality of circumferential grooves 74, that extend in the circumferential direction are formed in the main semi-cylindrical part 71 of the present Embodiment, as shown in FIG. 3.

Figure 3:
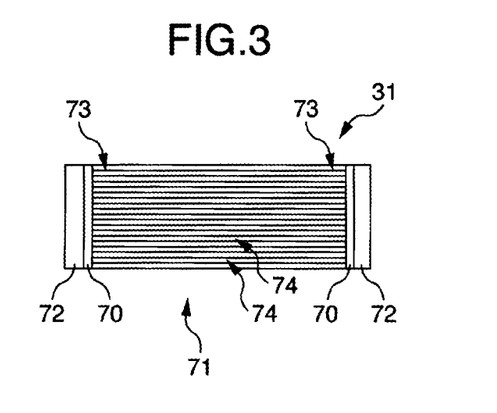
FIG. 3 is a bottom view of the half bearing of Embodiment 1.
Figure 4:
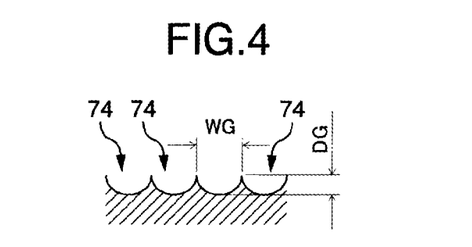
FIG. 4 is a sectional view of a plurality of circumferential grooves that are formed in a main semi-cylindrical part of the half bearing of Embodiment 1.

The circumferential grooves 74 are formed along the entire length, in the circumferential direction, in the inner circumferential surface of the main semi-cylindrical part 71 of the half bearing 31, as shown in FIGS. 3 and 4. Further, the circumferential grooves 74 are formed without interruption to extend into the transition regions 73, 73 that are located at both ends of the main semi-cylindrical part 71, which will be described later. Furthermore, the circumferential grooves 74 are arranged in plurality to be parallel to one another in a widthwise direction of the half bearing 31 and are formed to span across the entire width. Accordingly, the plurality of circumferential grooves 74, are formed over the entire region of the inner circumferential surface (semicylindrical surface) of the main semi-cylindrical part 71, and thus a planar region does not exist therein.

To describe in more detail, the circumferential groove 74 is formed into a circular arc shape (a shape where a circular arc section is in the back side) having a predetermined groove width WG and a predetermined groove depth DG, as shown in FIG. 4. In other words, individual circumferential grooves 74 are U-shaped cut grooves and are arranged in parallel in the widthwise direction at regular intervals (WG) to generally form a saw blade shaped or shallow comb-like shaped section. Here, the groove width WG refers to a distance between peaks of adjacent crests in the widthwise direction of the half bearing 31, and the groove depth DG refers to a distance from a peak to a bottom of a trough in a direction perpendicular to the inner circumferential surface. In particular, it is preferable that the circumferential grooves 74 have the groove width WG of 0.05 mm to 0.75 mm and the groove depth DG of 1 μm to 8 μm.

In addition, the plurality of circumferential grooves 74 all have the same groove width WG and the same groove depth DG, and the groove width WG and the groove depth DG are constant along the circumferential direction. Thus, a pressure loss (form loss) of the lubricating oil that flows in the circumferential grooves 74 can be prevented. Note that although it is preferable that the circumferential grooves 74 are circular arc shaped or U-shaped, the circumferential groove 74 may be in any shape that can guide a flow of the lubricating oil and may be V-shaped.

Figure 5:
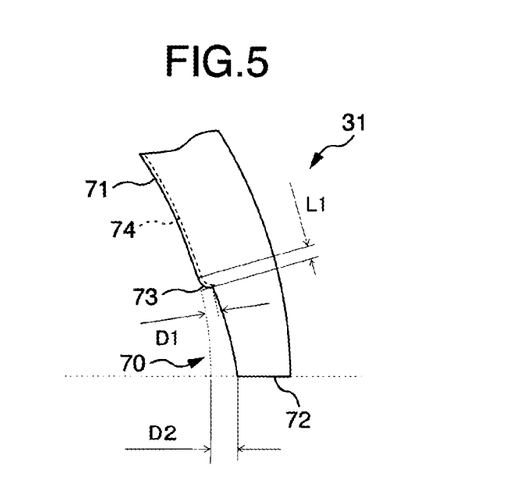
FIG. 5 is an enlarged view of an A-section shown in FIG. 2.
Figure 6:
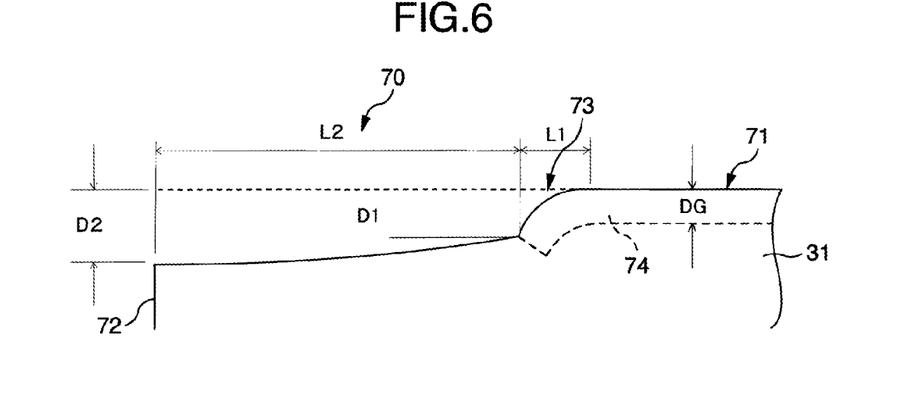
FIG. 6 is a developed view in which the main semi-cylindrical part in the A-section is two-dimensionally developed to describe specific dimensions.

Then, the transition region 73 in which the thickness of the wall is gradually reduced toward the crush relief 70 is formed adjacent to the main semi-cylindrical part 71, as shown in FIGS. 5 and 6. In other words, in the transition region 73, a sloped curved surface is formed so as to approach a mating shaft from the inner surface of the crush relief 70 toward the inner surface of the main semi-cylindrical part 71.

The transition region 73 as viewed in an axial direction of the half bearing 31 is formed of an inwardly convex curved surface that inwardly projects in a radial direction of the half bearing 31. That is, a slope of the sloped curved surface of the transition region 73 with respect to the imaginary inner circumferential plane of the half bearing 31 as viewed in the axial direction of the half bearing 31 is the maximum at a position connecting to the crush relief 70 and reaches the minimum at a position connecting to the main semi-cylindrical part 71 to smoothly connect to the main semi-cylindrical part 71. Here, the "inwardly convex curved surface" refers to a state where concavities and convexities of the circumferential grooves 74 are present in the widthwise direction and means that an outline (envelope surface) is curved in the circumferential direction.

Note that it is sufficient that the shape of the inner surface of the transition region 73 is in such a shape that an oil flow F3 that flows near the surface of the crush relief 70 is converted into an oil flow F2 that is oriented more toward the mating shaft, as described later. Accordingly, the shape of the inner surface does not need to be the inwardly convex curved surface, and may, for example, be planar (linear along a section) (see FIG. 9), or may be an outwardly concave curved surface (outwardly concave curve along a section) (see FIG. 10). More preferably, the shape of the inner surface can be an S-shaped curved surface in which a side closer to the crush relief 70 is an outwardly concave curved surface and a side farther therefrom is an inwardly convex curved surface (see FIG. 11).

Then, as shown in FIG. 3, the plurality of circumferential grooves 74, that are formed in the main semi-cylindrical part 71 are formed to extend in series into the transition region 73 as well. The circumferential grooves 74 that are formed in the transition region 73 have the same groove width WG as the circumferential grooves 74 that are formed in the main semi-cylindrical part 71, and the groove width WG and the groove depth are constant along the circumferential direction. Thus, a pressure loss (flow loss) of the lubricating oil that flows in the circumferential grooves 74 from the transition region 73 into the main semi-cylindrical surface can be prevented. Note that although it is preferable that the groove depth in the transition region 73 is the same as the groove depth DG in the main semi-cylindrical part 71, the groove can be made deeper or can be made shallower.

The crush relief 70 is a wall-thickness-reduced region that is formed in a region adjacent to a circumferential end surface 72 of the half bearing 31 (see FIG. 5) such that a thickness of the wall is thinner than that of the main semi-cylindrical part 71. The crush relief 70 is provided with an intention of absorbing misalignment or deformation of joining surfaces (circumferential end surfaces 72) in a state where the pair of half bearings 31 and 32 are assembled to the connecting rod 2.

The crush relief 70 of the present Embodiment is formed such that a depth D2 at a position of the end surface 72 is greater (deeper) than a depth D1 at a position connecting to the transition region 73, as shown in FIGS. 5 and 6. Here, the depth of the crush relief 70 refers to a distance to the surface of the crush relief 70 from the imaginary inner circumferential plane in which the inner circumferential surface of the main semi-cylindrical part 71 is extended over the crush relief 70.

Further, the crush relief 70 of the present Embodiment is formed of an outwardly concave curved surface that outwardly caves or recedes in the radial direction of the half bearing 31. That is, a slope of the inner surface of the crush relief 70 with respect to the imaginary inner circumferential plane of the half bearing 31 as viewed in the axial direction of the half bearing 31 is the maximum at a position connecting to the transition region 73 and reaches the minimum at a position of the end surface 72 to become substantially parallel to the imaginary inner circumferential plane.

Next, with reference to FIG. 6, specific dimensions of the crush relief 70 and the transition region 73 will be described. FIG. 6 is a developed view in which the inner circumferential surface of the main semi-cylindrical part 71 is developed to be planar (linear along the section). A length L2 and the depth D2 of the crush relief 70 may be the same as those of an existing crush relief. For example, although it may vary depending on the specifications of an internal combustion engine, in a case of a bearing for a small-sized internal combustion engine for an automobile, the length L2 is approximately 3 mm to 7 mm, and the depth D2 is approximately 0.01 mm to 0.05 mm.

The depth D1 of the crush relief 70 at a position connecting to the transition region 73 can be set to 0.005 mm to 0.030 mm. If the depth D1 is within this range, an amount of oil that reaches this connecting position is increased, and thus the oil flow F2 (see FIG. 8) can be formed. That is, in a case where the depth D1 is less than 0.005 mm, an amount of oil that reaches the connecting position is decreased, and thus it is hard to form the oil flow F2. On the other hand, in a case where the depth D1 exceeds 0.030 mm, a space in the crush relief 70 at a widthwise end of the half bearing 31 (a space sandwiched between the inner surface of the crush relief 70 and the imaginary inner circumferential plane) is increased, and thus an amount of the lubricating oil that leaks out through both ends of the half bearings 31 in the widthwise direction of the half bearing 31 is increased.

The length L1 of the transition region 73 in the circumferential direction can be set to 1 mm to 4 mm. If the length L1 is within this range, the oil flow F2 of a predetermined flow rate is formed and collides with an oil flow F1, which results in the formation of a turbulent flow. That is, in a case where the length L1 is 0 or less than 1 mm, a step constituted by a perpendicular plane is generated between the main semi-cylindrical surface of the main semi-cylindrical part 71 and the inner surface of the crush relief 70. Thus, a resistance to the oil flow F3 is increased excessively, so that the lubricating oil leaks out and thus the oil flow F2 is less likely to be formed. On the other hand, in a case where the length L1 exceeds 4 mm, a flow direction of the oil flow F2 approaches a flow direction of the oil flow F1, and thus even when the oil flow F2 and the oil flow F1 collide with each other, a turbulent flow is less likely to be formed.

Note that the shapes of the main semi-cylindrical part 71, the crush relief 70, and the transition region 73 described above can be measured with a typical shape measuring instrument such as a roundness measuring instrument. That is, in a state where a bearing is assembled to a connecting rod, an engine block, or a housing similar to these, the shape of the inner surface of the bearing can be measured continuously in the circumferential direction.

(Operation)

Subsequently, an operation of the half bearing 31 of the present Embodiment will be described with reference to FIGS. 7 to 11.

A case is considered in which the vicinity of the circumferential end of the inner circumferential surface (the main semi-cylindrical part 71) of the half bearing 31 (32) comes into direct contact with the surface of the mating shaft in a state where the circumferential end surfaces of the pair of half bearings 31 and 32 are misaligned as shown in FIG. 7. In this state, the main semi-cylindrical surface of the main semi-cylindrical part 71 and the surface of the crush relief 70 are in close proximity to the surface of the mating shaft at the vicinity of one end of the half bearing 31 which is misaligned inwardly (an upper right portion and a lower left portion in FIG. 7).

Figure 8:
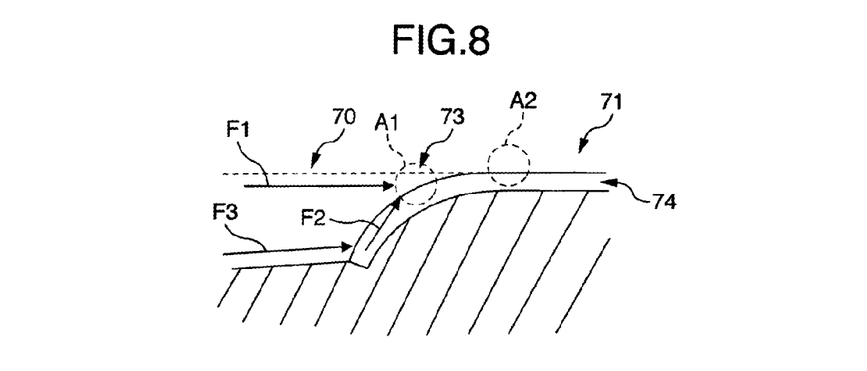
FIG. 8 is an operation diagram for describing an operation of the half bearing of Embodiment 1.

When the surface of the crush relief 70 and the surface of the mating shaft are in close proximity to each other, the oil flow F3 that flows near the surface of the crush relief 70 is first formed, as shown in FIG. 8. Then, the oil flow F3 is guided into the circumferential grooves 74 that are formed in the transition region 73, and thus the oil flow F2 that flows toward the main semi-cylindrical part 71 is formed. Subsequently, the oil flow F2 collides in a collision region A1 with the oil flow F1 that flows in the circumferential direction following along the surface of the shaft, thereby being mutually disturbed to form a turbulent flow. Heat in the half bearing 31 which is generated in a contact region A2 where the surface of the shaft makes contact with the inner circumferential surface of the bearing is conducted to the flow of the lubricating oil which has been turned into a turbulent flow, and thus the half bearing 31 is cooled. To be more specific, a turbulent flow of the lubricating oil changes into a laminar flow of the lubricating oil while the lubricating oil flows from the collision region A1 to the contact region A2, and thus heat in the half bearing 31 which is generated in the contact region A2 is less likely to be conducted to the lubricating oil. However, since heat in the surface of the half bearing 31 in the vicinity of the collision region A1 is conducted to the lubricating oil that has been turned into a turbulent flow in the collision region A1, a temperature gradient is generated in the surface of the half bearing 31 between the collision region A1 and the contact region A2. Then, inside the half bearing 31, heat in the contact region A2 is conducted to the collision region A1 in order to reduce the generated temperature gradient, and thus the contact region A1 of the half bearing 31 is cooled as a result.

In particular, as the depth D2 at a position of the end surface of the crush relief 70 is greater than the depth D1 at a position connecting to the transition region 73, the oil flow F2 is further intensified. That is, a space between the crush relief 70 and the surface of the mating shaft becomes gradually narrower toward the transition region 73 from the end surface 72.

Accordingly, the flow rate of the oil flow F3 that flows near the surface of the crush relief 70 increases toward the transition region 73, and thus the oil flow F2 is more likely to be formed.

Figure 18:
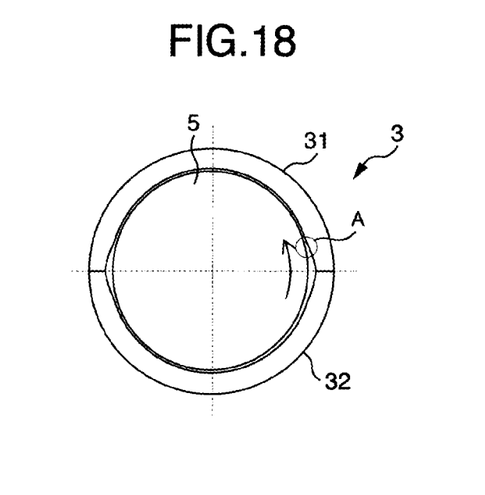
FIG. 18 is a front view showing a state where circumferential end surfaces of the half bearings are aligned.
Figure 19:
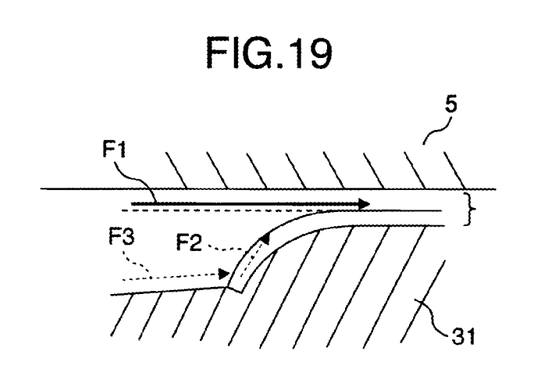
FIG. 19 is an operation view for describing an operation of the half bearing in a state shown in FIG. 18.

On the other hand, in a state where the positions of the circumferential end surfaces of the pair of half bearings 31 and 32 are aligned as shown in FIG. 18, a sufficient space is generated between the inner circumferential surface (the main semi-cylindrical part 71) of the bearing and the surface of the shaft as shown in FIG. 19. Thus, while the oil flow F1 is intensified, the oil flow F3 and the oil flow F2 are weakened since the surface of the crush relief 70 is sufficiently distanced from the surface of the shaft. Accordingly, a turbulent flow is not formed, nor is a pressure loss of the lubricating oil generated, and thus a mechanical loss in the internal combustion engine is not increased either.

Figure 9:
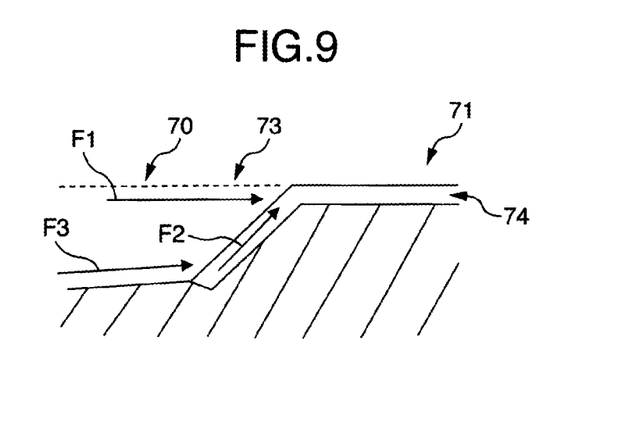
FIG. 9 is a sectional view showing a transition region of another mode.
Figure 10:
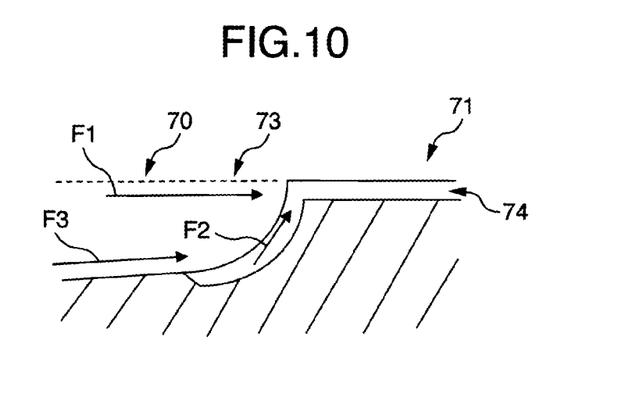
FIG. 10 is a sectional view showing a transition region of another mode.

Further, since the transition region 73 of the present Embodiment includes an inwardly convex curved surface, a space is generated between the collision region A1 in which the oil flow F1 and the oil flow F2 collide with each other and the contact region A2. Thus, a volume of the lubricating oil to be turned into a turbulent flow increases, and conduction of heat from the half bearing 31 is facilitated. For example, as shown in FIGS. 9 and 10, in a case where the transition region 73 is formed of a planar sloped surface or an outwardly concave curved surface, a space for temporarily storing the lubricating oil that has been turned into a turbulent flow is small, and thus conduction of heat may not be facilitated.

Figure 11:
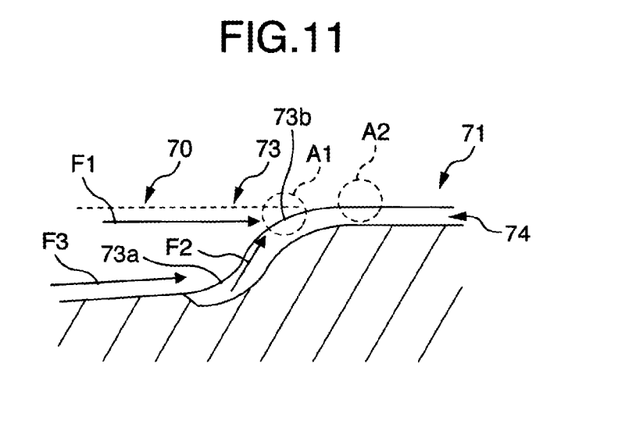
FIG. 11 is a sectional view showing a transition region of another mode.

Subsequently, with reference FIG. 11, a case where the transition region 73 includes an outwardly concave curved surface 73a at a side closer to the crush relief 70 and an inwardly convex curved surface 73b at a side farther therefrom to generally form an S-shaped curved surface will be described as another mode of the transition region 73. In a case where the transition region 73 is formed of an S-shaped curved surface as such, conduction of heat is further facilitated. To be more specific, since a space is generated between the collision region A1 and the contact region A2 by the inwardly convex curved surface 73b at the side farther from the crush relief 70 similarly to the above description, a volume of the lubricating oil to be turned into a turbulent flow increases. Further, since an intersecting angle of the oil flow F2 with respect to the oil flow F1 is increased by the outwardly concave curved surface 73a at the side closer to the crush relief 70, generation of a turbulent flow is facilitated.

(Effect)

The effects of the half bearing 31 and the connecting rod bearing 3 of the present Embodiment will be listed and described.

(1) The half bearing 31 of the present Embodiment is the half bearing 31 that constitutes the connecting rod bearing 3 serving as a plain bearing for supporting a crank shaft of an internal combustion engine. One of the half bearings 31, 32 includes the main semi-cylindrical part 71 that is formed at the center of the half bearing 31 in the circumferential direction and the crush reliefs 70, 70 that are formed at both circumferential ends of the half bearing 31 such that the thickness of the wall is thinner than that of the main semi-cylindrical part 71. Then, the half bearing 31 of the present Embodiment further includes the transition regions 73, 73 that are formed adjacent to the both circumferential ends of the main semi-cylindrical part 71 such that the thickness of the wall is gradually thinner toward the crush relief 70. The crush relief 70 is formed such that the depth D2 at a position of the circumferential end surface 72 of the half bearing 31 is greater than the depth D1 at a position connecting to the transition region 73. Further, the plurality of circumferential grooves 74, that extend in the circumferential direction are formed in the main semi-cylindrical part 71, and the plurality of circumferential grooves 74, are formed to extend into the transition region 73 as well.

With such a configuration, in a state where the position of the end surface 72 of the half bearings 31 is misaligned, the oil flow F1 that flows in the circumferential direction following along the surface of the shaft and the oil flow F2 that flows toward the main semi-cylindrical part 71 by being guided by the transition region 73 intersect to collide with each other, whereby a turbulent flow is generated. Accordingly, heat generated as the circumferential end of the main semi-cylindrical part 71 of the half bearing 31 comes into contact with the mating shaft is conducted efficiently to the lubricating oil that has been turned into a turbulent flow, and thus the half bearing 31 can be prevented from reaching such a high temperature that causes damage thereto.

(2) The transition region 73 can be formed of an inwardly convex curved surface that inwardly projects in the radial direction of the half bearing 31. Thus, a space is generated between the collision region A1 in which the oil flow F1 and the oil flow F2 collide with each other and the contact region A2. Accordingly, a volume of the lubricating oil to be turned into a turbulent flow increases, and conduction of heat from the half bearing 31 is facilitated.

(3) The transition region 73 can also be formed of the outwardly concave curved surface 73a that outwardly caves or recedes in the radial direction at the side closer to the crush relief 70 and the inwardly convex curved surface 73b that inwardly projects in the radial direction at the side farther from the crush relief 70. In a case where the transition region 73 includes an S-shaped curved surface as such, conduction of heat is further facilitated. That is, by including the inwardly convex curved surface 73b, a volume of the lubricating oil to be turned into a turbulent flow increases, and by including the outwardly concave curved surface 73a, generation of the turbulent flow is facilitated.

(4) The crush relief 70 may preferably be such that the depth D1 thereof at a position connecting to the transition region 73 is 0.005 mm to 0.030 mm. If the depth D1 is within this range, an amount of oil that reaches this connecting position is increased, and thus the oil flow F2 can be formed.

(5) The length L1 of the transition region 73 in the circumferential direction is preferably 1 mm to 4 mm. If the length L1 is within this range, the oil flow F2 of a predetermined flow rate is formed to collide with the oil flow F1, and thus a turbulent flow is generated.

(6) The connecting rod bearing 3 serving as a plain bearing of the present Embodiment includes a pair of any of the above-described half bearings 31 and is formed by assembling the pair of half bearings 31 and 32 into a cylindrical shape.

Embodiment 2

Subsequently, with reference to FIGS. 12 to 14, a case where, unlike Embodiment 1, a groove is also formed in the crush relief 70 and this groove is not offset with respect to the circumferential grooves 74 will be described. Note that a part that is the same or equivalent to the content described in Embodiment 1 will be described with the same reference character.

First, the configuration will be described. As shown in FIG. 12, one of the half bearings 31, 32 of the present Embodiment includes the main semi-cylindrical part 71, the crush reliefs 70, 70, and the transition regions 73, 73, similarly to Embodiment 1. The plurality of circumferential grooves 74, that extend in the circumferential direction are formed in the main semi-cylindrical part 71, and the circumferential grooves 74 are formed to extend into the transition regions 73, 73 as well.

Figure 12:
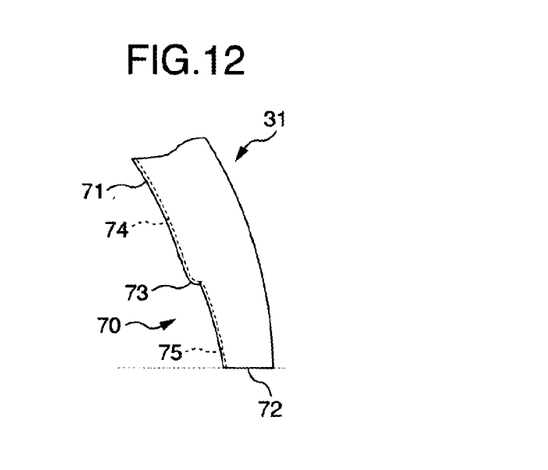
FIG. 12 is an enlarged view of a portion that corresponds to the A-section shown in FIG. 2 in a half bearing of Embodiment 2.
Figure 13:
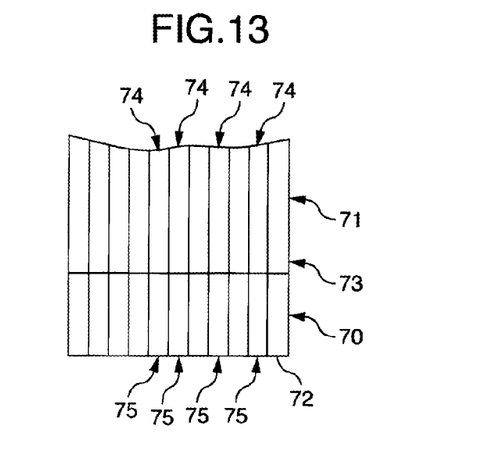
FIG. 13 is an internal view showing a positional relationship between circumferential grooves and crush relief grooves in the half bearing of Embodiment 2.
Figure 14:
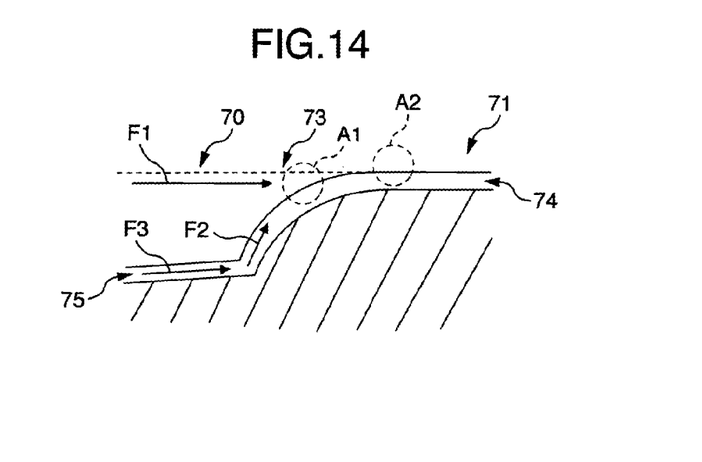
FIG. 14 is an operation diagram for describing an operation of the half bearing of Embodiment 2.

Then, as shown in FIGS. 12, 13, and 14, a plurality of crush relief grooves 75, that extend in the circumferential direction are formed in the crush relief 70 of the present Embodiment. The crush relief grooves 75 are formed in the inner surface of the crush relief 70 along the entire length in the circumferential direction. Further, the crush relief grooves 75 are arranged in plurality to be parallel to one another in the widthwise direction of the half bearing 31 to span across the entire width.

To describe more specifically, the crush relief grooves 75 are formed into a circular arc shape (a shape where a circular arc section is in the back) having a predetermined groove width and a predetermined groove depth, as in the circumferential groove 74 in the main semi-cylindrical part 71 and the transition region 73. The groove width is the same as the groove width WG of the circumferential groove 74. The groove depth is preferably the same as the groove depth DG of the circumferential groove 74, but the groove depth does not need to be the same. The shape is preferably a circular arc shape, but may also be a V-shape.

Then, the plurality of crush relief grooves 75, of the present Embodiment are aligned in the widthwise direction with the plurality of circumferential grooves 74, that are formed in the main semi-cylindrical part 71 and the transition region 73 such that the troughs (concave shaped openings) of the crush relief grooves 75 correspond to the troughs (concave shaped openings) of the circumferential grooves 74. In other words, the crush relief grooves 75 in the crush relief 70 and the circumferential grooves 74 are arranged such that the positions of the respective center portions in the groove widths coincide with each other in the widthwise direction of the half bearing 31 at the connecting position of the crush relief 70 and the transition region 73, and thus the oil flow of the lubricating oil flows smoothly.

Subsequently, the operation will be described. First, as shown in FIG. 14, the oil flow F3 that flows near the surface of the crush relief 70 is intensified and guided into the crush relief grooves 75. Then, the oil flow F3 is guided smoothly into the circumferential grooves 74 from the crush relief grooves 75, and thus the oil flow F2 that flows toward the main semi-cylindrical part 71 is formed. Subsequently, the oil flow F2 collides in the collision region A1 with the oil flow F1 that flows in the circumferential direction following along the surface of the shaft, to thereby being mutually disturbed to form a turbulent flow. Heat in the half bearing 31 which is generated in the contact region A2 where the surface of the shaft makes contact with the inner circumferential surface of the bearing is conducted to the lubricating oil that has been turned into a turbulent flow, and thus the half bearing 31 is cooled.

Subsequently, the effects of the half bearing 31 of the present Embodiment will be listed and described.

(1) The plurality of crush relief grooves 75, that extend in the circumferential direction are formed in the crush relief 70 of the present Embodiment, and the groove width of the crush relief grooves 75 is the same as the groove width WG of the circumferential grooves 74 that are formed in the main semi-cylindrical part 71. Accordingly, since the oil flow F3 is guided into the crush relief grooves 75, a large amount of the lubricating oil can be made to flow, and an amount of conducted heat can be increased.

(2) The plurality of crush relief grooves 75, that are formed in the crush relief 70 is aligned with the plurality of circumferential grooves 74, that are formed in the main semi-cylindrical part 71 in the widthwise direction of the half bearing 31. Accordingly, the resistance generated when the lubricating oil flows into the circumferential grooves 74 from the crush relief grooves 75 is reduced; thus, a large amount of the lubricating oil can be made to flow, and an amount of conducted heat can be increased.

Note that the configurations and effects aside from the above are substantially the same as those of Embodiment 1, and thus the description thereof will be omitted.

Embodiment 3

Subsequently, with reference to FIGS. 15 to 17, a case where, unlike Embodiment 2, a groove is also formed in the crush relief 70 and this groove is offset with respect to the circumferential groove 74 will be described. Note that a part that is the same or equivalent to the content described in Embodiment 1 or 2 will be described with the same reference character.

First, the configuration will be described. As shown in FIG. 15, one of the half bearings 31, 32 of the present Embodiment includes the main semi-cylindrical part 71, the crush reliefs 70, 70, and the transition regions 73, 73, similarly to Embodiments 1 and 2. The plurality of circumferential grooves 74, that extend in the circumferential direction are formed in the main semi-cylindrical part 71, and the circumferential grooves 74 are formed to extend into the transition regions 73, 73 as well.

Figure 15:
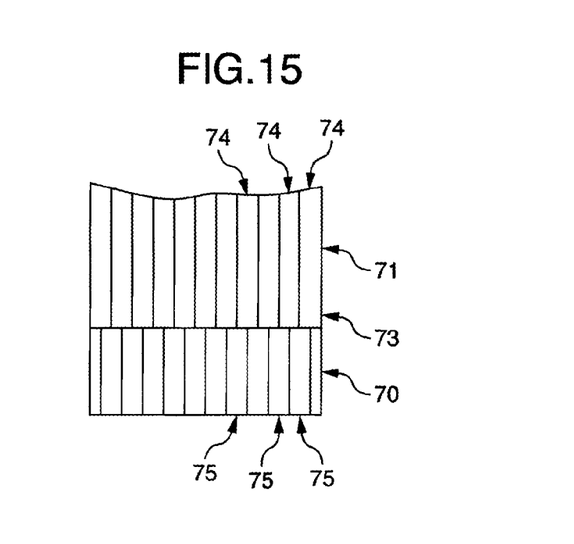
FIG. 15 is an internal view showing a positional relationship between circumferential grooves and crush relief grooves in a half bearing of Embodiment 3.
Figure 16:
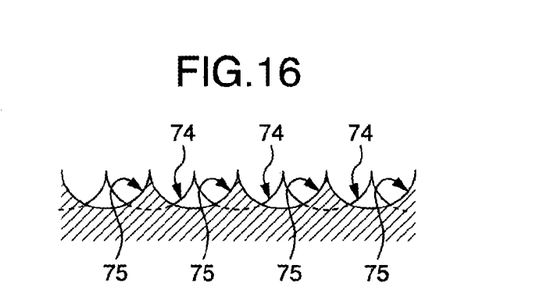
FIG. 16 is a sectional view showing the circumferential grooves and the crush relief grooves in the half bearing of Embodiment 3.
Figure 17:
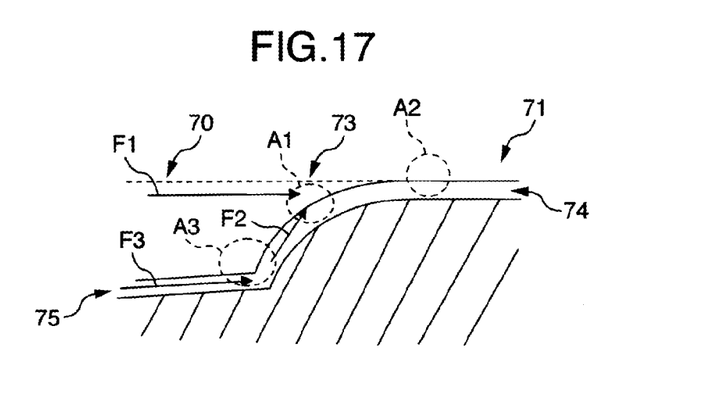
FIG. 17 is an operation diagram for describing an operation of the half bearing of Embodiment 3.

As shown in FIGS. 15, 16, and 17, the plurality of crush relief grooves 75, that extend in the circumferential direction are formed in the crush relief 70. Then, the plurality of crush relief grooves 75, of the present Embodiment are offset with respect to the plurality of circumferential grooves 74, that are formed in the main semi-cylindrical part 71 and the transition region 73 by a half of the groove width WG in the widthwise direction and are arranged such that the troughs (concave shaped openings of the crush relief grooves) of the crush relief grooves 75 correspond to the crests (convexities formed between two adjacent circumferential grooves 74) of the circumferential grooves 74 in the connecting position of the crush relief 70 and the transition region 73. Accordingly, the oil flow of the lubricating oil is subjected to the resistance at the connecting position of the crush relief 70 and the transition region 73. Note that although an example where the plurality of crush relief grooves 75, are offset with respect to the plurality of circumferential grooves 74, that are formed in the main semi-cylindrical part 71 and the transition region 73 by a half of the groove width WG in the widthwise direction is shown in the present Embodiment, the present invention is not limited thereto. The plurality of crush relief grooves 75, may be offset with respect to the plurality of circumferential grooves 74, that are formed in the main semi-cylindrical part 71 and the transition region 73 by an amount in a range greater than 0 and less than the groove width WG in the widthwise direction. In other words, it is sufficient that the crush relief grooves 75 and the circumferential grooves 74 are arranged such that the positions of the respective center portions in the groove widths are offset from each other by an amount in a range at least greater than 0 and at most less than the groove width WG in the widthwise direction of the half bearing 31 at the connection position of the crush relief 70 and the transition region 73.

Subsequently, the operation will be described. As shown in FIG. 17, first, the oil flow F3 that flows near the surface of the crush relief 70 is intensified and guided into the crush relief grooves 75. Then, the oil flow F3 enters the circumferential grooves 74 from the crush relief grooves 75. At this point, the oil flow F3 is subjected to the resistance from the crests of the circumferential grooves 74, and thus a turbulent flow is generated in the connection region A3. Subsequently, the oil flow F2 is guided into the circumferential grooves 74 in the transition region 73. Then, the oil flow F2 collides in the collision region A1 with the oil flow F1 that flows in the circumferential direction following along the surface of the shaft, to thereby be mutually disturbed to intensify the turbulent flow. Heat in the half bearing 31 which is generated in the contact region A2 where the surface of the shaft makes contact with the inner circumferential surface of the bearing is conducted to the lubricating oil in which the turbulent flow has been intensified, and thus the half bearing 31 is cooled.

Subsequently, the effects will be described. The plurality of crush relief grooves 75, that are formed in the crush relief 70 of the present Embodiment is out of phase with respect to the plurality of circumferential grooves 74, that are formed in the main semi-cylindrical part 71 and the transition region 73 by an amount in a range at least greater than 0 and at most less than the groove width WG in the widthwise direction of the half bearing 31. Accordingly, while the lubricating oil is retained by the crush relief grooves 75, formation of a turbulent flow is facilitated at two positions of the connection region A3 and the collision region A2, and thus an amount of conducted heat can be further increased. That is, as the crush relief grooves 75 are shifted (offset) with respect to the circumferential grooves 74 in the widthwise direction of the half bearing, the lubricating oil is subjected to the resistance from the crests of the circumferential grooves 74, and thus the oil flow F2 is weakened, whereby formation of a turbulent flow in the collision region Al is suppressed. On the contrary, since formation of a turbulent flow is facilitated in the connection region A3, as a whole, formation of a turbulent flow is facilitated and an amount of conducted heat is increased.

Note that the configurations and effects aside from the above are substantially the same as those of Embodiment 1 or 2, and thus the description thereof will be omitted.

Embodiment 4

Figure 20:
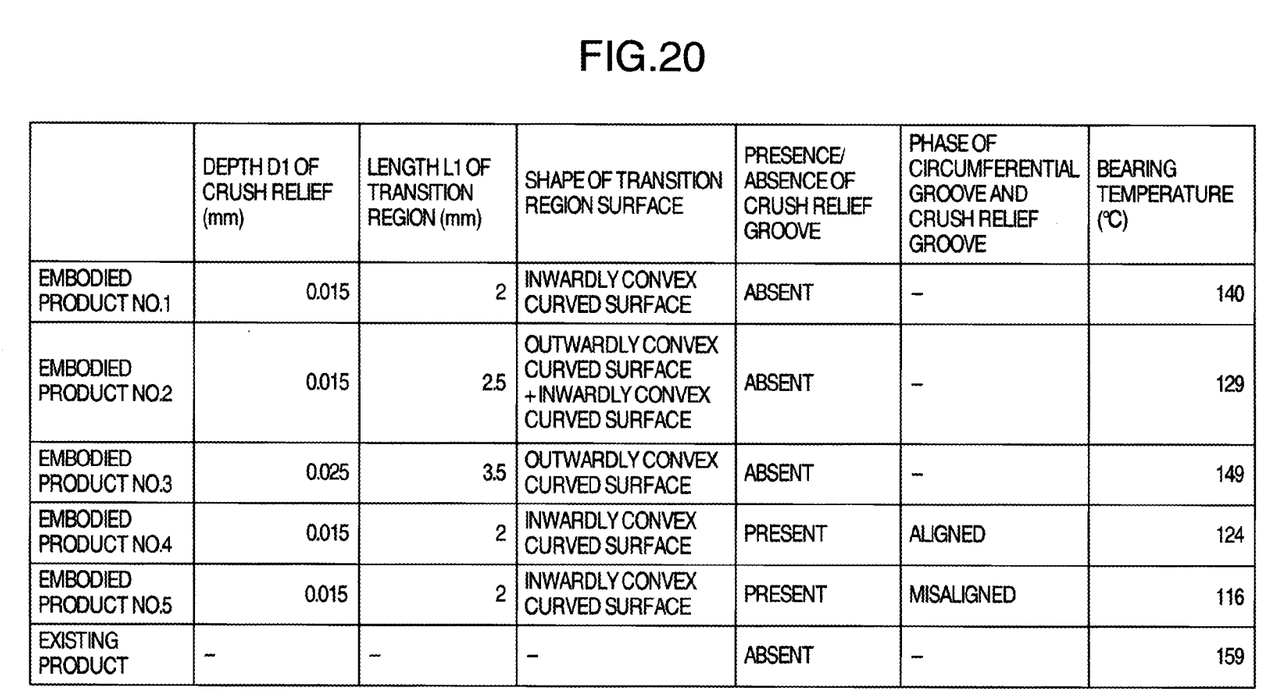
FIG. 20 is a table showing test conditions and results of an effect confirmation test.

Subsequently, a test conducted to confirm the effects of the half bearing 31 of Embodiments 1 to 3 will be described with reference to tables in FIGS. 20 and 21.

(Test Conditions)

First, test conditions will be described. A test was carried out on embodied products and an existing product shown in FIG. 20. Here, an embodied product No. 1 corresponds to Embodiment 1, in which the transition region was formed of an inwardly convex curved surface. An embodied product No. 2 corresponds to another mode of Embodiment 1 shown in FIG. 11, in which the transition region was formed of an S-shaped continuing curved surface that included an outwardly concave curved surface and an inwardly convex curved surface. An embodied product No. 3 corresponds to another mode of Embodiment 1 shown in FIG. 10, in which the transition region was formed of an outwardly concave curved surface. An embodied product No. 4 corresponds to Embodiment 2, in which the transition region was formed of an inwardly convex curved surface and a crush relief groove that was aligned in phase with a circumferential groove was formed in the crush relief. An embodied product No. 5 corresponds to Embodiment 3, in which the transition region was formed of an inwardly convex curved surface and a crush relief groove that was out of phase with respect to a circumferential groove was formed in the crush relief. The existing product had an existing crush relief, and the transition region was not formed therein.

For each of the embodied products No. 1 to No. 5 and the existing product, a half bearing having an outer diameter of 48 mm, an inner diameter of 45 mm, and a width of 15 mm was used, and the test was carried out on a plain bearing in which a pair of half bearings was assembled into a cylindrical shape. Each of the crush reliefs of the embodied products No. 1 to No. 5 and the existing product was 5 mm in length from the circumferential end surface of the half bearing and 0.04 mm in depth at the circumferential end surface of the half bearing. A plurality of circumferential grooves were formed in the inner circumferential surface of the embodied products at the main semi-cylindrical part and the transition region. The groove depth of the circumferential groove was 3 μm, and the groove width thereof was 0.15 mm, which were constant across the circumferential direction of the bearing. Further, (the plurality of) circumferential grooves were formed to span across the entire width of the bearing in the widthwise direction. A plurality of crush relief grooves were formed in the crush reliefs of the embodied products No. 4 and No. 5. The groove depth of the crush relief groove was 3 μm, and the groove width thereof was 0.15 mm. A plurality of circumferential grooves were formed in the main semi-cylindrical part of the existing product. The groove depth of the circumferential groove was 3 μm, and the groove width thereof was 0.15 mm, which were constant across the circumferential direction of the bearing. Further, the plurality of circumferential grooves were formed to span across the entire width of the bearing in the widthwise direction. Note that other specifications of the embodied products and the existing product were as shown in Table 1.

Figure 21:
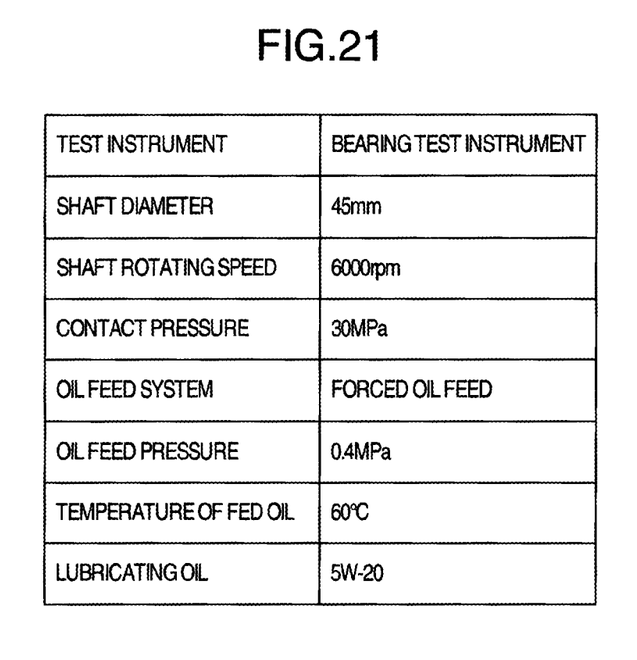
FIG. 21 is a table showing test conditions of an effect confirmation test.

A bearing test was carried out on the embodied products No. 1 to No. 5 and the existing product under the conditions shown in FIG. 21. On each of the embodied products and the existing product, a bearing test was carried out in which two half bearings were paired and embedded into a bearing holding portion (not shown) of a split type bearing housing such that the vicinity of a circumferential end of an inner circumferential surface (main semi-cylindrical part) of the half bearing came into contact with a shaft in a state where the positions of the respective circumferential end surfaces of the pair of half bearings were misaligned (see FIG. 7). Immediately after the bearing test was completed, a temperature of the half bearing in each embodied products was measured at the rear surface of a circumferential end portion of the inner circumferential surface (main semi-cylindrical part) of the half bearing which was in contact with the shaft. Measured bearing temperatures are shown in FIG. 20.

(Results)

Subsequently, test results will be briefly described. As shown in FIG. 20, while the existing product showed 159° C., the embodied products No. 1 to No. 5 showed 140° C., 129° C., 149° C., 124° C., and 116° C., respectively. In this way, it is found that in any of the embodied products, a turbulent flow was generated in the circumferential end of the inner circumferential surface of the half bearing by the transition region and a rise in temperature of the half bearing due to coming into contact with the shaft was suppressed as compared to the existing product. In particular, it is shown that effects were greater in the embodied products No. 4 and No. 5. Note that individual considerations on the respective embodied products are omitted since they coincide with the description of the operations and effects described in Embodiments 1 to 3 above.

Figure 22:
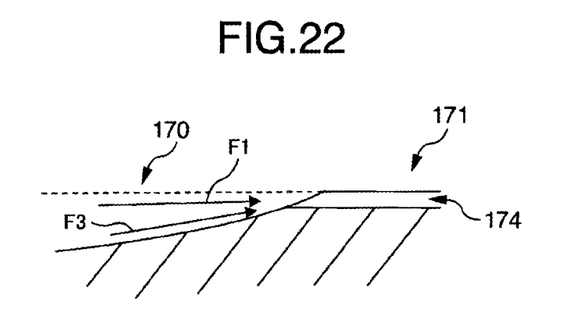
FIG. 22 is an operation diagram for describing an operation of an existing half bearing.

On the contrary, the existing product does not have a configuration of a transition region between a circumferential end of an inner circumferential surface (main semi-cylindrical part) 171 of the half bearing and a crush relief 170. Therefore, as shown in FIG. 22, the oil flow F3 that flows near the surface of the crush relief 170 and the oil flow F1 that flows in the circumferential direction following along the surface of the shaft are formed as oil flows of the lubricating oil from the crush relief 170 toward the inner circumferential surface (main semi-cylindrical part) 171 of the half bearing. Since the direction of the oil flow F1 and the direction of the oil flow F3 are oriented substantially the same direction at the end of the crush relief 170, these oil flows are not disturbed by each other, and the lubricating oil flows toward the inner circumferential surface (main semi-cylindrical part) 171 of the half bearing as a laminar flow. Since heat in the half bearing is less likely to be conducted to the laminar flow of the lubricating oil, a rise in temperature of the half bearing due to coming into contact with the shaft was greatest in the existing product.

Thus far, Embodiments of the present invention have been described in detail with reference to the drawings. However, specific configurations are not limited to these Embodiments, and modifications in design to such a degree that does not depart from the scope of the present invention are encompassed by the present invention.

For example, the configurations of the crush relief 70, the main semi-cylindrical part 71, and the transition region 73 may be formed only in one half bearing 31 (32) of the pair of half bearings 31 and 32, or may be formed in both of the half bearings 31 and 32.

The invention claimed is:

1. A half bearing for supporting a crank shaft of an international combustion engine, the half bearing comprising:
   a main semi-cylindrical part including a center portion of the half bearing in a circumferential direction;
   two crush reliefs, each crush relief having a thickness arranged at each circumferential end of the half bearing, the thickness of the crush relief being thinner than that of the main semi-cylindrical part; and
   two transition regions, each transition region having a thickness arranged between the main semi-cylindrical part and the crush relief, the thickness of the transition region being thinner towards the crush relief, wherein each transition region includes an inwardly convex curved surface projecting inwardly in a radial direction of the half bearing,
   wherein, an imaginary inner circumferential plane is coplanar with an inner circumferential surface of the main semi-cylindrical part,
   wherein for each crush relief a distance between the imaginary plane and the crush relief at a circumferential end surface of the half bearing is greater than a distance between the imaginary plane and a connection between the crush relief and the transition region, and
   wherein a plurality of circumferential grooves extend in a circumferential direction in the main semi-cylindrical part along an entire length of the main semi-cylindrical part, the plurality of circumferential grooves extend into the transition region, and the plurality of circumferential grooves all have the same groove width and the same groove depth, and the groove width and the groove depth are constant along the circumferential direction.

2. The half bearing according to claim 1, wherein each transition region includes an outwardly concave curved surface caving outwardly in the radial direction at a side closer to the crush relief and the inwardly convex curved surface projecting inwardly in the radial direction at a side farther from the crush relief.

3. The half bearing according to claim 1, wherein each crush relief includes a plurality of crush relief grooves extending in a circumferential direction, and a groove width of each crush relief groove is the same as a groove width of each circumferential groove in the main semi-cylindrical part.

4. The half bearing according to claim 3, wherein the plurality of crush relief grooves in the crush relief are offset with respect to the plurality of the circumferential grooves in the main semi-cylindrical part and in the transition region by an amount more than 0 and less than the groove width in a widthwise direction of the half bearing, whereby troughs of the crush relief grooves correspond to crests of the circumferential grooves.

5. The half bearing according to claim 3, wherein the plurality of crush relief grooves in the crush relief are aligned with the plurality of circumferential grooves in the main semi-cylindrical part and in the transition region in the widthwise direction of the half bearing, whereby crests of the crush relief grooves correspond to crests of the circumferential grooves.

6. The half bearing according to claim 1, wherein a distance between the imaginary plane and the connection between the crush relief and the transition region is 0.005 mm to 0.030 mm.

7. The half bearing according to claim 1, wherein a length of the transition region in the circumferential direction is 1 mm to 4 mm.

8. A plain bearing comprising two half bearings, the half bearings being to be assembled in cylindrical shape, wherein at least one half bearing is according to any one of claims 1 and 2 to 7.

* * * * *